US012607479B2

(12) United States Patent
Wakayama

(10) Patent No.: US 12,607,479 B2
(45) Date of Patent: Apr. 21, 2026

(54) MOVING OBJECT, CONTROL METHOD OF MOVING OBJECT, NON-TRANSITORY COMPUTER-READABLE STORAGE MEDIUM, AND MOVING OBJECT CONTROL SYSTEM

(71) Applicant: HONDA MOTOR CO., LTD., Tokyo (JP)

(72) Inventor: Ryoji Wakayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 18/238,867

(22) Filed: Aug. 28, 2023

(65) Prior Publication Data

US 2024/0102824 A1 Mar. 28, 2024

(30) Foreign Application Priority Data

Sep. 27, 2022 (JP) ................................ 2022-153977

(51) Int. Cl.
*G01C 21/00* (2006.01)
*G01C 21/36* (2006.01)
(Continued)

(52) U.S. Cl.
CPC ..... *G01C 21/3837* (2020.08); *G01C 21/3691* (2013.01); *G06T 7/60* (2013.01);
(Continued)

(58) Field of Classification Search
CPC ..... B60Y 2200/20; G01S 17/89; G06V 20/58; G06T 5/30
See application file for complete search history.

(56) References Cited

U.S. PATENT DOCUMENTS

| | | | | |
|---|---|---|---|---|
| 11,077,847 | B2 | 8/2021 | Takayanagi et al. | |
| 2020/0202107 | A1 * | 6/2020 | Ozkucur | G06F 18/22 |
| 2022/0289237 | A1 * | 9/2022 | Vu | G01S 17/89 |

FOREIGN PATENT DOCUMENTS

| | | | | |
|---|---|---|---|---|
| CN | 114397654 B * | 6/2022 | G01S 7/41 |
| JP | 2014-006588 A | 1/2014 | |

(Continued)

OTHER PUBLICATIONS

Fan, H., Yao, W., & Tang, L. (2013). Identifying man-made objects along urban road corridors from mobile LiDAR data. IEEE Geoscience and Remote Sensing Letters, 11(5), 950-954. (Year: 2013).*

(Continued)

*Primary Examiner* — Hitesh Patel
*Assistant Examiner* — Tabitha Kress
(74) *Attorney, Agent, or Firm* — THOMAS | HORSTEMEYER, LLP

(57) ABSTRACT

A moving object acquires three-dimensional point cloud data in surroundings of the moving object; and generates a grid map based on the three-dimensional point cloud data, the moving object maps point clouds of the three-dimensional point cloud data to a grid on a horizontal plane parallel to a road surface on which the moving object travels and generates the grid map in which each grid indicates whether a three-dimensional object having a predetermined height or a step exists. The moving object determines, for each grid of the grid map, whether the three-dimensional object exists based on a point density when a point cloud corresponding to each grid of the three-dimensional point cloud data is projected on the horizontal plane.

15 Claims, 11 Drawing Sheets

(51) Int. Cl.
*G06T 7/60* (2017.01)
*G06T 7/73* (2017.01)

(52) U.S. Cl.
CPC ...... *G06T 7/73* (2017.01); *G06T 2207/10012* (2013.01); *G06T 2207/10028* (2013.01); *G06T 2207/30261* (2013.01)

(56) References Cited

FOREIGN PATENT DOCUMENTS

| | | | |
|---|---|---|---|
| JP | 2014-174275 | A | 9/2014 |
| JP | 2018031753 | A | 3/2018 |
| JP | 2019-079375 | A | 5/2019 |
| JP | 2022-541656 | A | 9/2022 |
| WO | 2018038257 | A1 | 3/2018 |
| WO | 2021/021672 | A2 | 2/2021 |

OTHER PUBLICATIONS

Börcs, A., Nagy, B., & Benedek, C. (2017). Instant object detection in lidar point clouds. IEEE Geoscience and Remote Sensing Letters, 14(7), 992-996. (Year: 2017).*

Agarwal, P., Husain, A., & Ranjan, R. K. (Nov. 2021). Pole Like Object Detection using PCA inTerrestrial LiDAR System. In Journal of Physics: Conference Series (vol. 2089, No. 1, p. 012004). IOP Publishing. (Year: 2021).*

Press, T. U. (May 27, 2022). Exploring the limits of shared autonomous micro-mobility. Techxplore.com; Tech Xplore. (Year: 2022).*

Phetcharat, S., Nagai, M., & Tipdecho, T. (2014). Influence of surface height variance on distribution of ground control points. Journal of Applied Remote Sensing, 8(1), 083684-083684. (Year: 2014).*

(2014). PCA for 3-dimensional Point Cloud. Algosome.com. (Year: 2014).*

Oniga, F., & Nedevschi, S. (2009). Processing dense stereo data using elevation maps: Road surface, traffic isle, and obstacle detection. IEEE Transactions on Vehicular Technology, 59(3), 1172-1182. (Year: 2009).*

Zhou, Y., & Tuzel, O. (2018). Voxelnet: End-to-end learning for point cloud based 3d object detection. In Proceedings of the IEEE conference on computer vision and pattern recognition (pp. 4490-4499). (Year: 2018).*

Ahmed, S. M., & Chew, C. M. (2020). Density-based clustering for 3d object detection in point clouds. In Proceedings of the IEEE/CVF Conference on Computer Vision and Pattern Recognition (pp. 10608-10617). (Year: 2020).*

Japanese Office Action for Japanese Patent Application No. 2022-153977 mailed Jul. 14, 2025 (partially translated).

* cited by examiner

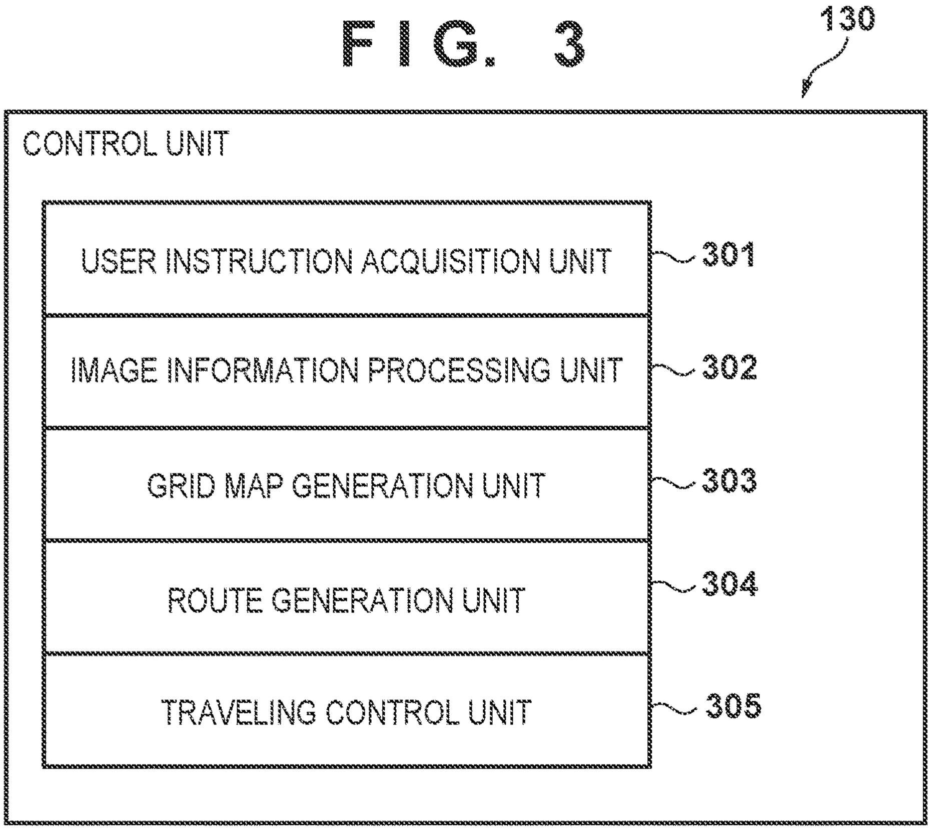
F I G. 3
130
CONTROL UNIT
| | |
|---|---|
| USER INSTRUCTION ACQUISITION UNIT | ~301 |
| IMAGE INFORMATION PROCESSING UNIT | ~302 |
| GRID MAP GENERATION UNIT | ~303 |
| ROUTE GENERATION UNIT | ~304 |
| TRAVELING CONTROL UNIT | ~305 |
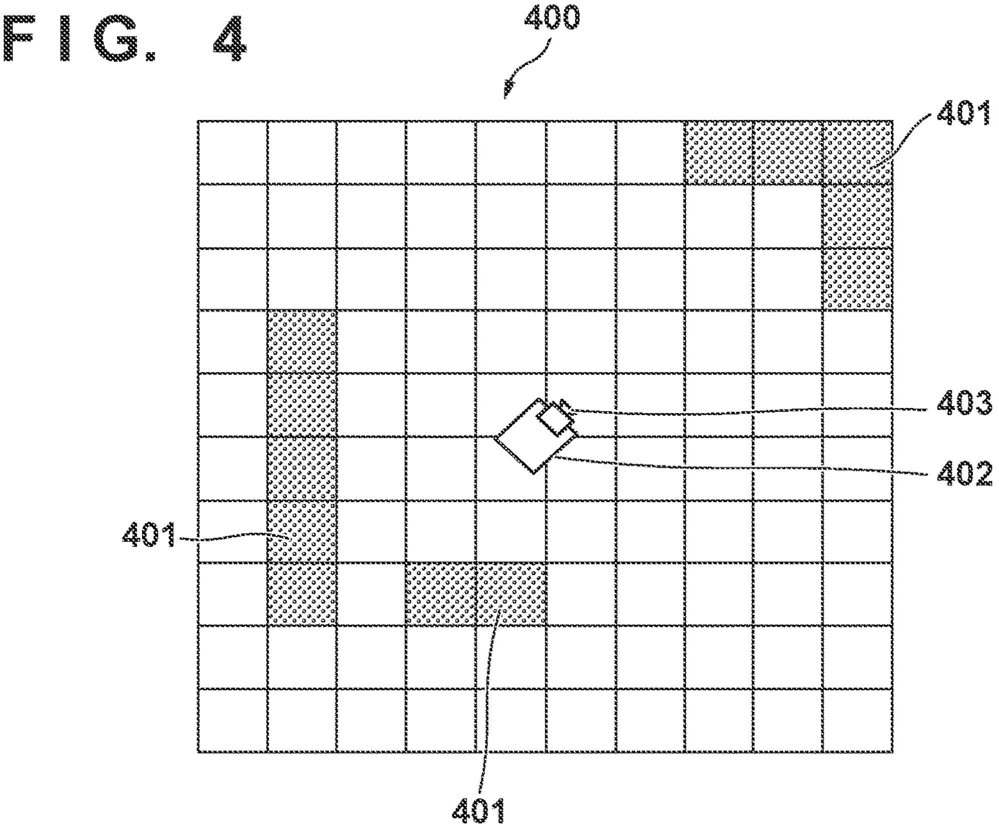
F I G. 4
400
401
403
402
401
401

MOVING OBJECT, CONTROL METHOD OF MOVING OBJECT, NON-TRANSITORY COMPUTER-READABLE STORAGE MEDIUM, AND MOVING OBJECT CONTROL SYSTEM

CROSS-REFERENCE TO RELATED APPLICATION(S)

This application claims priority to and the benefit of Japanese Patent Application No. 2022-153977 filed on Sep. 27, 2022, the entire disclosure of which is incorporated herein by reference.

BACKGROUND OF THE INVENTION

Field of the Invention

The present invention relates to a moving object, a control method of a moving object, a non-transitory computer-readable storage medium, and a moving object control system.

Description of the Related Art

In these years, there is an increasing demand for ultra-compact moving objects (micro mobility vehicles) for supporting movements of people in small regions. Micro mobility vehicles include vehicles each having a riding capacity of one person or so, vehicles that travel carrying baggage along with a person, instead of carrying passengers, and the like. Micro mobility vehicles require an autonomous movement technology for a free space such as a sidewalk in addition to an automated driving technology for traveling on a roadway in order to enable traveling in both a movement region for automobiles and a movement region for pedestrians. For this reason, micro mobility vehicles are required to be able to autonomously travel without using a high-precision map and to travel while identifying the positions of obstacles or the position where the micro mobility vehicles themselves can travel.

Japanese Patent Laid-Open No. 2018-31753 proposes a technique for projecting three-dimensional point cloud data generated from an image acquired by a stereo camera onto a map in which cells on a grid are arranged on a two-dimensional surface and setting an object region on the two-dimensional map by performing predetermined processing.

In three-dimensional point cloud data, there is a case where point clouds occur in spaces without objects (that is, noise point clouds occur) due to accuracy related to position estimation of a stereo camera or the like. Noise point clouds include outlier point clouds with signals having values significantly different from those of surrounding point clouds (also referred to as spike noise) and point clouds with errors of similar intensity over a relatively wide range (also referred to as white noise). In Japanese Patent Laid-Open No. 2018-31753, when noise removal is performed on a binary two-dimensional map obtained by projecting three-dimensional point cloud data, it is proposed to perform contraction processing and expansion processing of the map, but noise removal that takes into consideration the characteristics of point clouds is not considered.

SUMMARY OF THE INVENTION

The present invention has been made in view of the above problems, and a purpose thereof is to achieve a technique capable of more suitably reducing the influence of noise when generating a grid-like map indicating the position of an object based on three-dimensional point cloud data.

In order to solve the aforementioned issues, one aspect of the present disclosure provides a moving object comprising: an acquisition unit configured to acquire three-dimensional point cloud data in surroundings of the moving object; and a generation unit configured to generate a grid map based on the three-dimensional point cloud data, the generation unit being configured to map point clouds of the three-dimensional point cloud data to a grid on a horizontal plane parallel to a road surface on which the moving object travels and generate the grid map in which each grid indicates whether a three-dimensional object having a predetermined height or a step exists, wherein the generation unit determines, for each grid of the grid map, whether the three-dimensional object exists based on a point density when a point cloud corresponding to each grid of the three-dimensional point cloud data is projected on the horizontal plane.

Another aspect of the present disclosure provides a control method of a moving object, the control method comprising: an acquisition step of acquiring three-dimensional point cloud data in surroundings of the moving object; and a generation step of generating a grid map based on the three-dimensional point cloud data, the generation step including mapping point clouds of the three-dimensional point cloud data to a grid on a horizontal plane parallel to a road surface on which the moving object travels and generating the grid map in which each grid indicates whether a three-dimensional object having a predetermined height or a step exists, wherein the generation step includes determining, for each grid of the grid map, whether the three-dimensional object exists based on a point density when a point cloud corresponding to each grid of the three-dimensional point cloud data is projected on the horizontal plane.

Still another aspect of the present disclosure provides a non-transitory computer-readable storage medium storing a program causing a computer to function as each unit of a moving object, the moving object comprising: an acquisition unit configured to acquire three-dimensional point cloud data in surroundings of the moving object; and a generation unit configured to generate a grid map based on the three-dimensional point cloud data, the generation unit being configured to map point clouds of the three-dimensional point cloud data to a grid on a horizontal plane parallel to a road surface on which the moving object travels and generate the grid map in which each grid indicates whether a three-dimensional object having a predetermined height or a step exists, wherein the generation unit determines, for each grid of the grid map, whether the three-dimensional object exists based on a point density when a point cloud corresponding to each grid of the three-dimensional point cloud data is projected on the horizontal plane.

Yet still another aspect of the present disclosure provides a control system of a moving object, the control system comprising: an acquisition unit configured to acquire three-dimensional point cloud data in surroundings of the moving object; and a generation unit configured to generate a grid map based on the three-dimensional point cloud data, the generation unit being configured to map point clouds of the three-dimensional point cloud data to a grid on a horizontal plane parallel to a road surface on which the moving object travels and generate the grid map in which each grid indicates whether a three-dimensional object having a predetermined height or a step exists, wherein the generation unit determines, for each grid of the grid map, whether the three-dimensional object exists based on a point density when a point cloud corresponding to each grid of the three-dimensional point cloud data is projected on the horizontal plane.

According to the present invention, it is possible to more suitably reduce the influence of noise when generating a grid-like map indicating the position of an object based on three-dimensional point cloud data.

BRIEF DESCRIPTION OF THE DRAWINGS

FIG. 3 is a block diagram illustrating a functional configuration example related to a control unit of a moving object according to an embodiment;

FIG. 4 is a diagram schematically illustrating a use example of a grid map according to an embodiment;

DESCRIPTION OF THE EMBODIMENTS

Figure 1A:
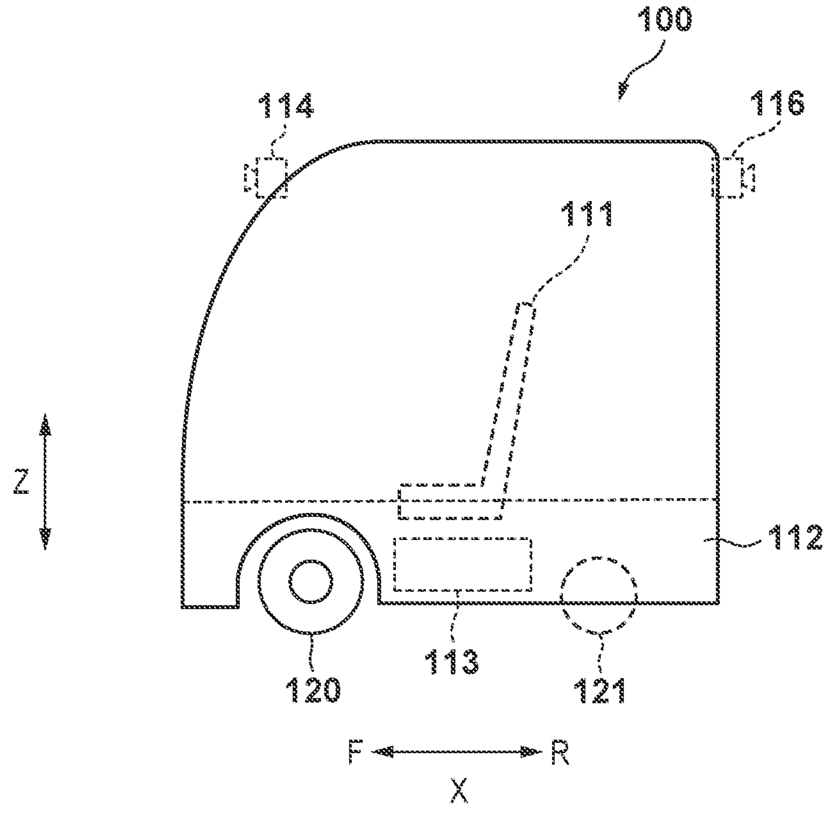
FIGS. 1A and 1B are diagrams illustrating a configuration example of a moving object according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In the following embodiments, as an example of a moving object that is a micro mobility vehicle, an ultra-compact electric vehicle having a riding capacity of one person or so will be described as an example. However, the present embodiment is not limited to this example, and can also be applied to a robot or the like capable of autonomous movement. In addition, the micro mobility vehicle may be any vehicle that travels carrying baggage along with a person, instead of carrying passengers.

It would be useful if autonomous driving could be achieved for moving objects such as micro mobility vehicles described above, taking into consideration that passengers get on the vehicles, that a target location changes frequently, and that high-precision maps are not used. When a passenger gets on a moving object, unlike an unmanned robot for delivery, if an unnatural traveling trajectory or a traveling trajectory that does not take riding comfort into consideration is selected, there is a risk of causing anxiety to the passenger on the moving object. In addition, when target location instructions from passengers are to be accepted, it is necessary to respond to changes in the target location. Furthermore, traveling is not limited to a specific fixed route, and it is necessary to appropriately travel in a region where a high-precision map is not prepared in order to be able to travel in both a movement region for automobiles and a movement region for pedestrians A moving object 100 according to the present embodiment autonomously travels toward a target location that can be changed without using a high precision map. Since autonomous traveling is possible without using a high-precision map, a travelable region of the moving object 100 is identified using only information recognized from an output of a detection unit, which will be described later. As will be described later, the moving object 100 generates a grid map representing a travelable region and a non-travelable region of the moving object 100, and uses the grid map to generate a traveling trajectory of the moving object 100. The moving object 100 generates a traveling trajectory that considers the positions of obstacles using, for example, dynamic window approach (DWA), and controls a drive system to travel along the traveling trajectory.

<Configuration of Moving Object>

Figure 1B:
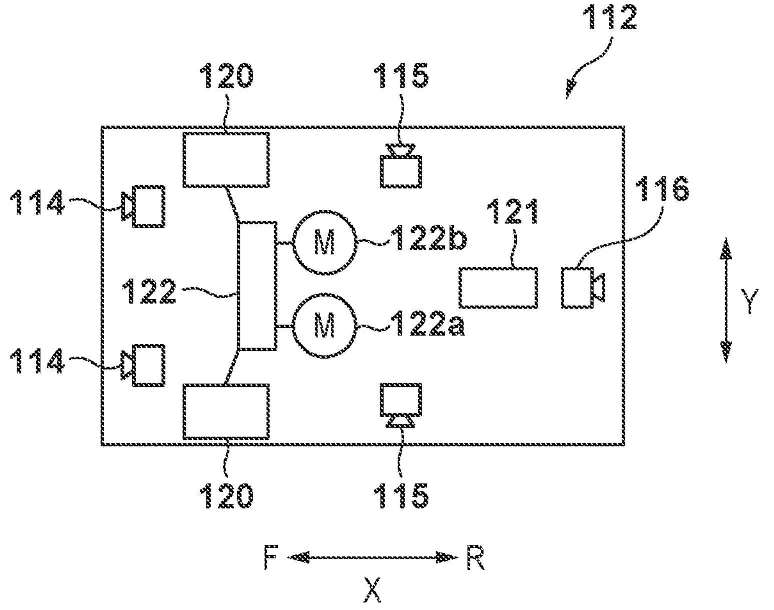

A configuration of the moving object 100 will be described with reference to FIGS. 1A and 1B. FIG. 1A illustrates a side view of the moving object 100 according to the present embodiment, and FIG. 1B illustrates an internal configuration of the moving object 100. In the drawings, an arrow X indicates a front-and-rear direction of the moving object 100, and F indicates the front, and R indicates the rear. Arrows Y and Z respectively indicate a width direction (a left-and-right direction) and an up-and-down direction of the moving object 100.

The moving object 100 is an electric autonomous vehicle including a traveling unit 112 and using a battery 113 as a main power supply. The battery 113 is, for example, a secondary battery such as a lithium ion battery, and the moving object 100 autonomously travels by the traveling unit 112 with electric power supplied from the battery 113. The traveling unit 112 has a form of a three-wheeled vehicle including a pair of left and right drive wheels 120, which are front wheels, and one driven wheel 121, which is a rear wheel. Note that the traveling unit 112 may have another form such as a form of a four-wheeled vehicle. The moving object 100 includes, for example, a single seat 111.

The traveling unit 112 includes a drive mechanism 122. The drive mechanism 122 is a mechanism that rotates the corresponding drive wheels 120 with motors 122*a* and 122*b* as drive sources. By rotating each of the drive wheels 120, the drive mechanism 122 is capable of moving the moving object 100 forward or backward. By making a difference in rotation between the motors 122*a* and 122*b*, the drive mechanism 122 is also capable of changing an advancing direction of the moving object 100. The traveling unit 112 includes the driven wheel 121. The driven wheel is capable of making a turn with the Z direction as a rotation axis.

The moving object 100 includes detection units 114 to 116, each of which detects a target object in the surroundings of the moving object 100. The detection units 114 to 116 are an external sensor group that monitors the periphery of the moving object 100. In the case of the present embodiment, each of the detection units 114 to 116 is an imaging device that captures an image in the surroundings of the moving object 100, and includes, for example, an optical system such as a lens and an image sensor. However, instead of or in addition to the imaging device, a radar or a light detection and ranging (LIDAR) can also be used.

For example, two detection units 114 are disposed on the front side of the moving object 100 to be spaced apart from each other in Y direction, and are mainly used for detecting a target object in front of the moving object 100. The detection units 115 are disposed on the left and right sides of the moving object 100, and are mainly used for detecting a target object in the lateral direction of the moving object 100. The detection unit 116 is disposed on the rear side of the moving object 100, and is mainly used for detecting a target object behind the moving object 100.

Figure 2:
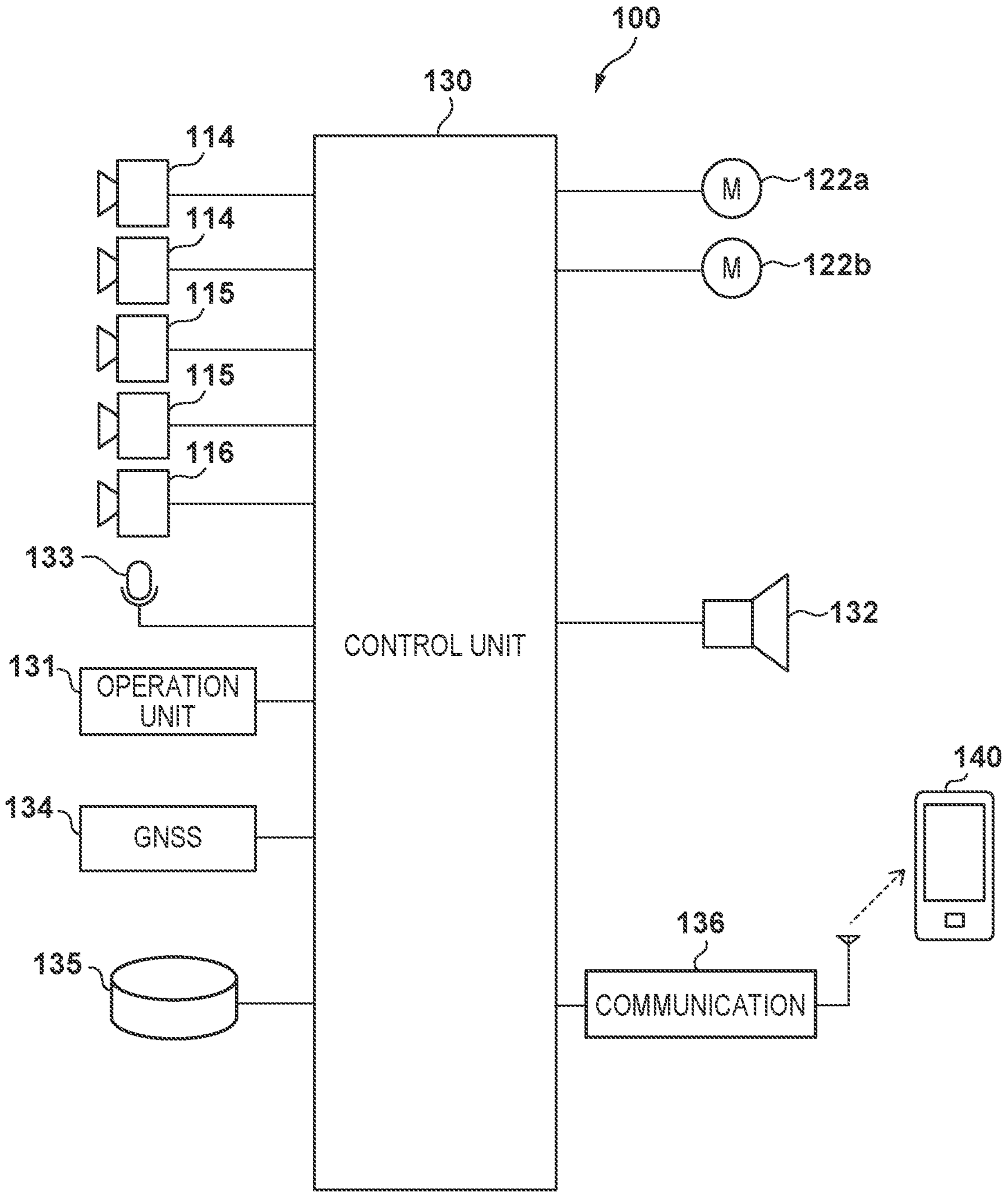
FIG. 2 is a block diagram illustrating a configuration example of a control system of a moving object according to an embodiment.

FIG. 2 is a block diagram of a control system of the moving object 100. The moving object 100 includes a control unit (ECU) 130. The control unit 130 includes one or more processors represented by a CPU, a memory device such as a semiconductor memory, an interface with an external device, and the like. The memory device stores programs to be executed by the processors, data to be used by the processors for processing, and the like. A plurality of sets of the processors, the memory device, and the interface may be provided for an individual function of the moving object 100 to be capable of communicating with each other.

The control unit 130 acquires outputs (for example, image information) from the detection units 114 to 116, input information into an operation unit 131, voice information input from a voice input device 133, and the like, and performs corresponding processing. The control unit 130 performs control of the motors 122*a* and 122*b* (travel control of the traveling unit 112) and display control of a display panel included in the operation unit 131, gives a notification to an occupant of the moving object 100 by sounds, and outputs information. The control unit 130 may perform processing using a machine learning model for image recognition (for example, a deep neural network) on the outputs from the detection units 114 to 116. In addition, the control unit 130 may perform processing using a machine learning model for voice recognition (for example, a deep neural network) on the outputs from the voice input device 133.

The voice input device 133 includes, for example, a microphone, and collects a voice of the occupant of the moving object 100. The control unit 130 can recognize the input voice and perform processing corresponding to the recognized input voice. A global navigation satellite system (GNSS) sensor 134 receives a GNSS signal, and detects a current location of the moving object 100.

A storage device 135 includes a non-transitory computer-readable storage medium that stores various types of data. The storage device 135 may also store programs to be executed by the processors, data to be used by the processors for processing, and the like. The storage device 135 may store various parameters (for example, learned parameters of a deep neural network, hyperparameters, and the like) of a machine learning model for voice recognition or image recognition to be executed by the control unit 130.

A communication device 136 is a communication device capable of communicating with an external device (for example, a communication terminal 140 owned by a user) via wireless communication, such as Wi-Fi or 5th generation mobile communication.

Next, a functional configuration example of the control unit 130 will be described with reference to FIG. 3. A user instruction acquisition unit 301 acquires a user instruction to be input via the operation unit 131 or the voice input device 133. The user instruction includes, for example, designation of a final target location at which the moving object 100 should arrive. The final target location may be a position of a target object designated by an utterance voice among target objects recognized in images output by the detection units 114 to 116. In addition, the user instruction may include a change instruction for a traveling trajectory, such as a right turn or a left turn, during traveling of the moving object 100.

An image information processing unit 302 generates three-dimensional point cloud data based on the outputs (for example, image information) of the detection units 114 to 116. The image information processing unit 302 generates a depth image including depth information from the moving object 100 using, for example, a stereo image obtained from the two detection units 114, and generates three-dimensional point cloud data based on the input image and the depth image. The three-dimensional point cloud data is, for example, a set of point data having relative three-dimensional coordinates from the moving object 100, generated based on a stereo image or the like. The image information processing unit 302 may use a machine learning model to generate the three-dimensional point cloud data.

Note that, in the present embodiment, a case where the image information processing unit 302 generates three-dimensional point cloud data using a stereo image will be described as an example, but the image information processing unit 302 may acquire three-dimensional point cloud data externally obtained using an image captured by a stereo camera. For example, the image information processing unit 302 may transmit an image captured by the stereo camera to an external device such as a server, and acquire three-dimensional point cloud data obtained using the image from the external device. Alternatively, the image information processing unit 302 may acquire three-dimensional point cloud data generated from a stereo image by a dedicated circuit (not illustrated) or the like mounted on the moving object 100.

A grid map generation unit 303 generates, based on the three-dimensional point cloud data generated by the image information processing unit 302, a grid map indicating, in the vicinity of the moving object 100, that each grid is a plane or that a three-dimensional object having a predetermined height or a step exists. Note that a ground that is distorted to an extent that the moving object 100 can travel on is determined here to be a "plane". The grid map is constituted by a grid on a horizontal plane parallel to the road surface on which the moving object 100 travels.

The grid map generation unit 303 maps point clouds of the three-dimensional point cloud data to the grid, determines the grid on which the three-dimensional object exists, and then generates the grid map by the noise removal processing. The grid map generation unit 303 can use any known technique, for example, when mapping the point clouds of the three-dimensional point cloud data to the two-dimensional grid. For example, as disclosed in Japanese Patent Laid-Open No. 2018-31753, in a three-dimensional coordinate system, points of a three-dimensional point cloud satisfying a certain condition may be voted on a two-dimensional grid map parallel to a road surface with a predetermined weight, a grid with a voting value greater than or equal to a predetermined threshold may be determined to be a grid on which a three-dimensional object exists, and other grids may be determined to be planes.

The grid map generation unit 303 according to the present embodiment updates the grid map by applying noise removal processing, which will be described later, to the grid indicating that the three-dimensional object exists in the generated grid map. In this manner, the number of grids to which the noise removal processing is to be applied can be limited, and the processing speed can be improved.

If the grid indicating a plane is set as a travelable region and the grid indicating that the three-dimensional object exists is set as a non-travelable region of the moving object 100, the grid map can be used as a map representing a region where the moving object 100 can travel and a region where the moving object 100 cannot travel in the vicinity of the moving object 100.

FIG. 4 schematically illustrates an example in which the grid map is used as a map representing a travelable region and a non-travelable region of the moving object 100. In the example illustrated in FIG. 4, the grid map is created by photographing the front of the moving object 100 with the detection units 114, and is used as a map 400 indicating a region 401 where the three-dimensional object exists and a planar region. The region 401 where the three-dimensional object exists can be treated as a non-travelable region indicating the presence of an obstacle, and the planar region can be treated as a travelable region. The grid map generation unit 303 shifts the map 400 such that the moving object is located at the center of the grid map according to the movement of the moving object 100. The grid map generation unit 303 generates a new grid map based on the three-dimensional point cloud data from the image information processing unit 302 as the moving object 100 moves, and updates the new grid map.

A route generation unit 304 performs route generation processing, which will be described later, and generates a trajectory (traveling trajectory) on which the moving object 100 travels. The route generation unit 304 uses, for example, dynamic window approach (DWA) to generate the traveling trajectory. The DWA can generate the trajectory on which the moving object 100 travels, taking into consideration constraints such as kinematics and an acceleration. Note that the traveling trajectory generated by the route generation unit 304 according to the present embodiment is sometimes referred to as a local route with respect to a global route, which will be described later. A global route is a route for heading toward a target location that is longer than the trajectory generated using the DWA (that is, the local route). The route generation unit 304 can generate the trajectory based on the target location by referring to the global route. In the present embodiment, the global route may not be used.

In the case of using the DWA, for example, the route generation unit 304 determines combinations of speed and angular velocity of the moving object that satisfy predetermined constraint conditions, and generate trajectories for the respective combinations. Then, the route generation unit 304 puts the generated trajectories into a cost function, and selects a trajectory with the lowest cost. As the predetermined constraint conditions, for example, a range of speed and angular velocity for preventing the moving object 100 from colliding with an obstacle and a range of a speed of the moving object determined from a travelable speed of the moving object 100 can be used. As the predetermined constraint conditions, a range of speed and angular velocity of the moving object determined from an acceleration (limit acceleration) at which the moving object 100 can accelerate can be further used. In the DWA, a combination of speed and angular velocity satisfying these conditions is a speed and an angular velocity satisfying the constraint conditions. Note that constraint conditions of speed and angular velocity according to an angle of the driven wheel can be further used as the constraint conditions. The constraint conditions considering the angle of the driven wheel impart, for example, a constraint to reduce a deviation between a direction of the driven wheel and the advancing direction of the moving object. In accordance with such constraint conditions, it is possible to achieve control of traveling at a low speed until the direction of the driven wheel approaches the advancing direction of the moving object 100.

The cost function can include, for example, the cost of deviation from a given global route, the cost of following a target speed, and the cost of approaching and colliding with an obstacle. The cost of deviation from the global route is configured such that the cost decreases as a difference (gap) between a generated trajectory and the global route is smaller. The cost of approaching and colliding with an obstacle is configured such that the cost increases as a distance from a non-travelable region (obstacle) is shorter, for example, by projecting a trajectory onto the grid map. The route generation unit 304 selects a speed v and an angular velocity w that minimize the cost function. In this manner, the route generation unit 304 can generate the traveling trajectory of the moving object 100.

Note that an example of generating the traveling trajectory with reference to the global route created in advance for the target location is described in the above example. By referring to the global route, the route generation unit 304 can generate the trajectory in the vicinity of the vehicle while avoiding an obstacle, taking into consideration a movement of the vehicle (using the DWA) along the route roughly determined to the target location.

The traveling control unit 305 controls traveling of the moving object 100 according to the trajectory selected by the route generation unit 304.

<Noise Removal Processing of Grid Map>

Figure 5A:
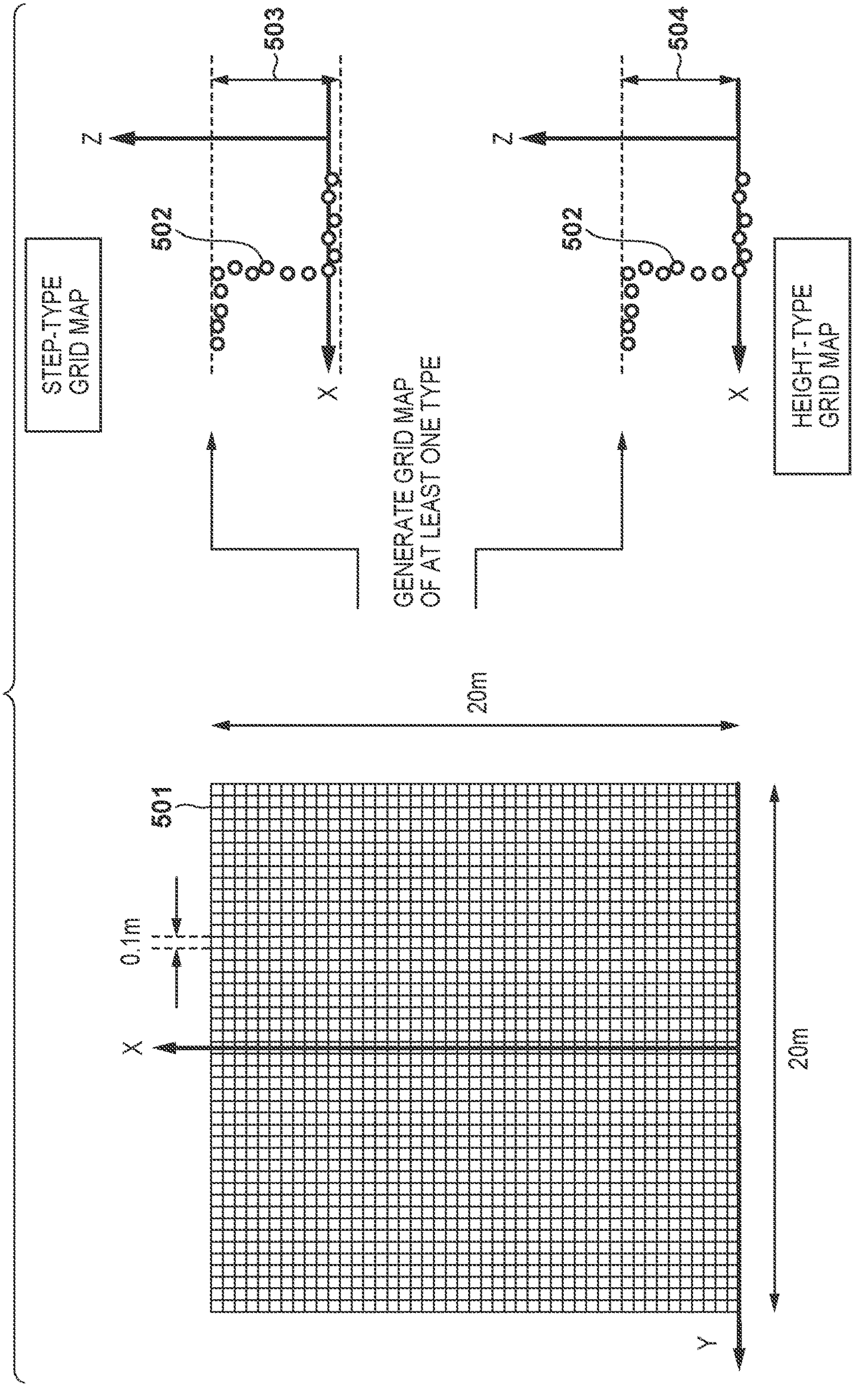
FIG. 5A is a diagram for explaining a grid map according to an embodiment.

Next, noise removal processing of a grid map in the grid map generation unit 303 will be described in more detail. FIG. 5A illustrates an example of a grid map according to the present embodiment. A grid map 501 is constituted by a grid on a horizontal plane parallel to a road surface on which the moving object 100 travels, and indicates that each grid is a plane or that a three-dimensional object having a predetermined height or a step exists. As described above, a ground that is distorted to an extent that the moving object 100 can travel on is determined here to be a "plane". The grid map 501 is configured to correspond to, for example, a region of 20 m in depth (X direction) from the moving object and 20 m to the left and right of the moving object. Each grid corresponds to, for example, a region with a size of 0.1 m square.

For example, the grid map generation unit 303 may generate the grid map 501 based on a difference 503 (that is, a step) between the maximum height and the minimum height of the point cloud on the grid for three-dimensional point cloud data 502 corresponding to the grid. A grid map generated based on the difference between the maximum height and the minimum height of the point cloud on the grid is referred to as, for example, a step grid map (step-type grid map). This grid map can express whether a three-dimensional object on the grid is a step. In addition, the grid map generation unit 303 may generate a height grid map (height-type grid map) instead of or in addition to the step grid map. This grid map is generated based on the maximum height of the point cloud on the grid from a reference point (for example, the road surface height). This grid map can express the topographic shape of the grid. In the present embodiment, a step-type grid map is used as an example, but it is not limited to this example, and a height-type grid map may be generated, or both grid maps may be generated.

In addition, when generating the grid map 501, the grid map generation unit 303 may remove a point cloud at a high position that does not affect traveling. For example, the grid map generation unit 303 sets the height of the moving object itself as a reference height. Then, the grid map generation unit 303 can add a height corresponding to a predetermined gradient (for example, 10%) at which the moving object 100 can travel and a distance between each grid and the moving object to the reference height, and remove a point cloud at or above the reference height after the addition.

Figure 5B:
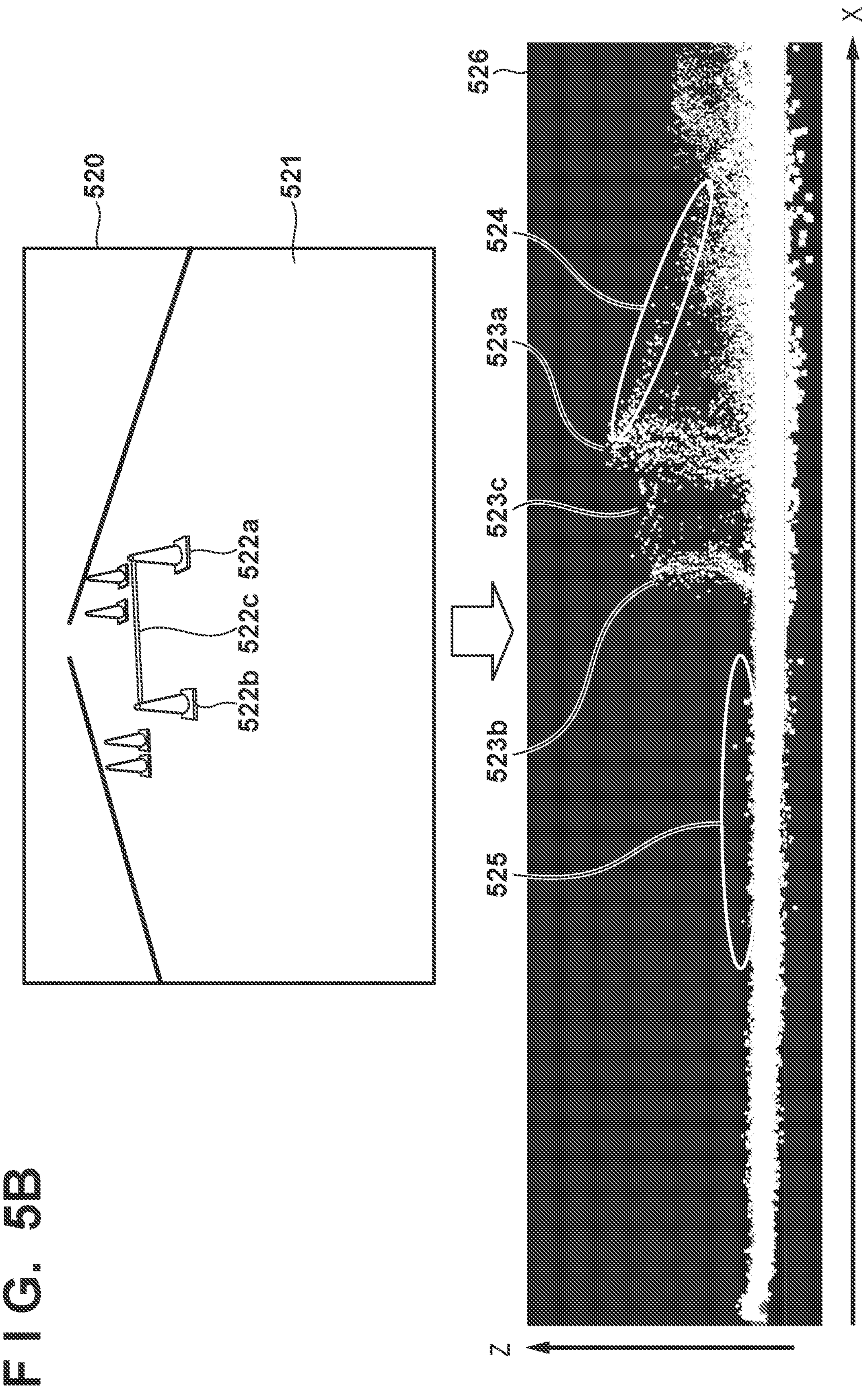
FIG. 5B is a diagram for explaining three-dimensional point clouds obtained in the present embodiment.

An example of a three-dimensional point cloud obtained in the present embodiment will be described with reference to FIG. 5B. An image 520 illustrates an example of a scene captured by detection units 114 of a traveling path on which the moving object 100 travels. The image 520 indicates that obstacles 522*a*, 522*b*, and 522*c* exist in front of the moving object, and other obstacles exist further ahead. An image 526 illustrates an example of three-dimensional point cloud data obtained using a stereo image captured by the detection units 114. In this example, point clouds 523*a*, 523*b*, and 523*c* corresponding to the obstacles 522*a*, 522*b*, and 522*c*, respectively, exist on a horizontal plane corresponding to the traveling path. In addition, on the horizontal plane corresponding to the traveling path, a point cloud 525 having become noise exists. Such noise is generally caused by, for example, accuracy related to position estimation of the stereo camera due to the presence or absence of texture, hiding, and the like. The point cloud 525 having become noise is an outlier point cloud (also referred to as spike noise) with a signal having a different value from those of the surrounding point clouds. In addition, a point cloud 524 having become noise also exists in the X direction of the point cloud 523*a* corresponding to the obstacle 522*a*, and the point cloud 524 is a point cloud with an error of a similar intensity over a relatively wide range (also referred to as white noise).

Figure 6A:
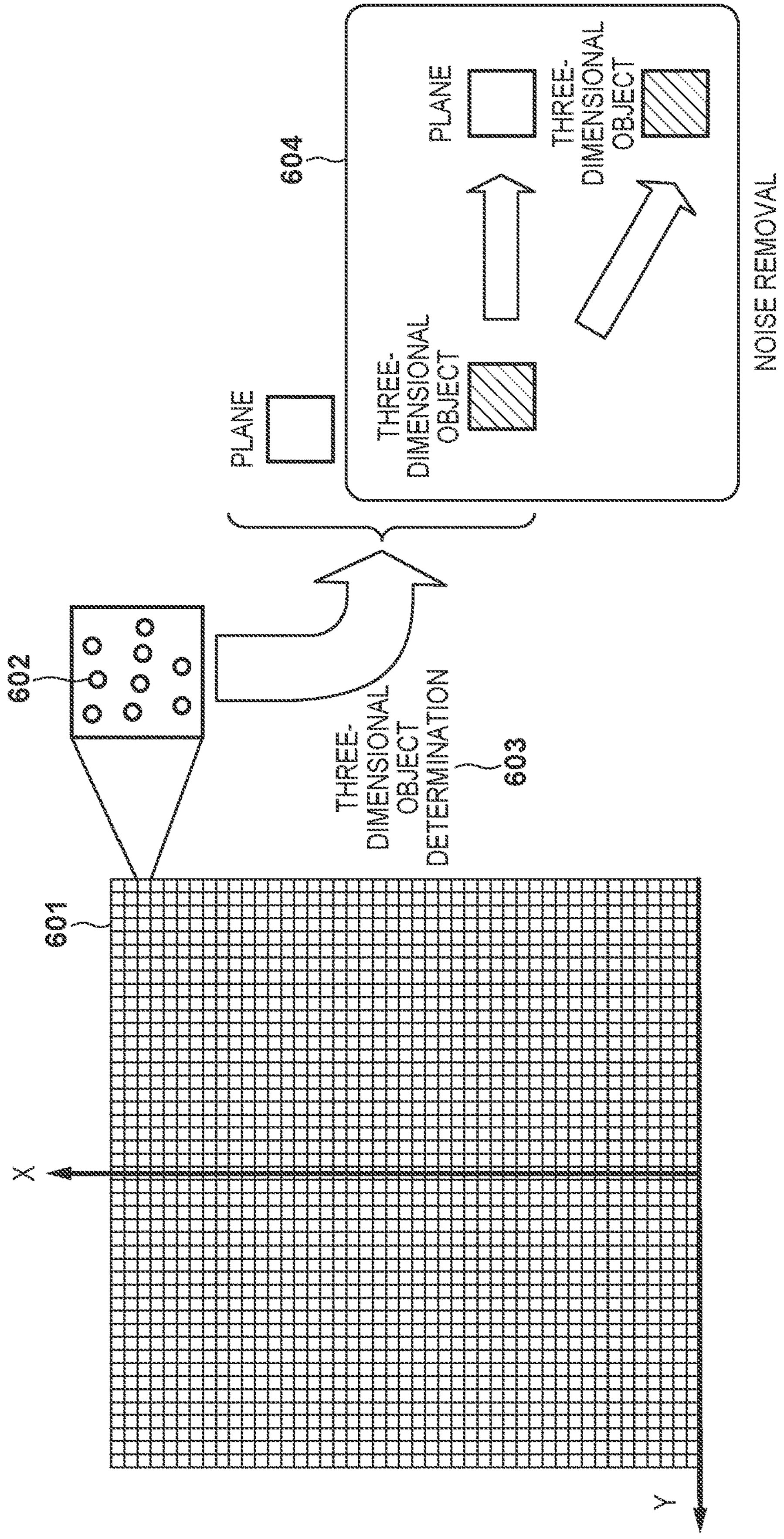
FIG. 6A is a diagram for explaining an outline of noise removal processing according to an embodiment.

Next, an outline of the noise removal processing according to the present embodiment will be described with reference to FIG. 6A. When three-dimensional point cloud data 602 including noise is mapped to a two-dimensional grid map 601 and it is determined whether a three-dimensional object exists on each grid by predetermined processing (three-dimensional object determination processing 603), such as the above known technology, a determination error can be included. That is, due to the influence of the point cloud 524 and the point cloud 525 described above, it is sometimes determined that a three-dimensional object exists on the grid even if it is a plane. Therefore, the grid map generation unit 303 according to the present embodiment further determines, for the grid on which a three-dimensional object is determined to exist by predetermined processing, whether the three-dimensional object exists by performing processing (referred to as noise removal processing), which will be described later. As the noise removal processing, the grid map generation unit 303 further determines whether the three-dimensional object exists based on, for example, a point density when the point cloud corresponding to each grid of the three-dimensional point cloud data is projected on the horizontal plane.

Figure 6B:
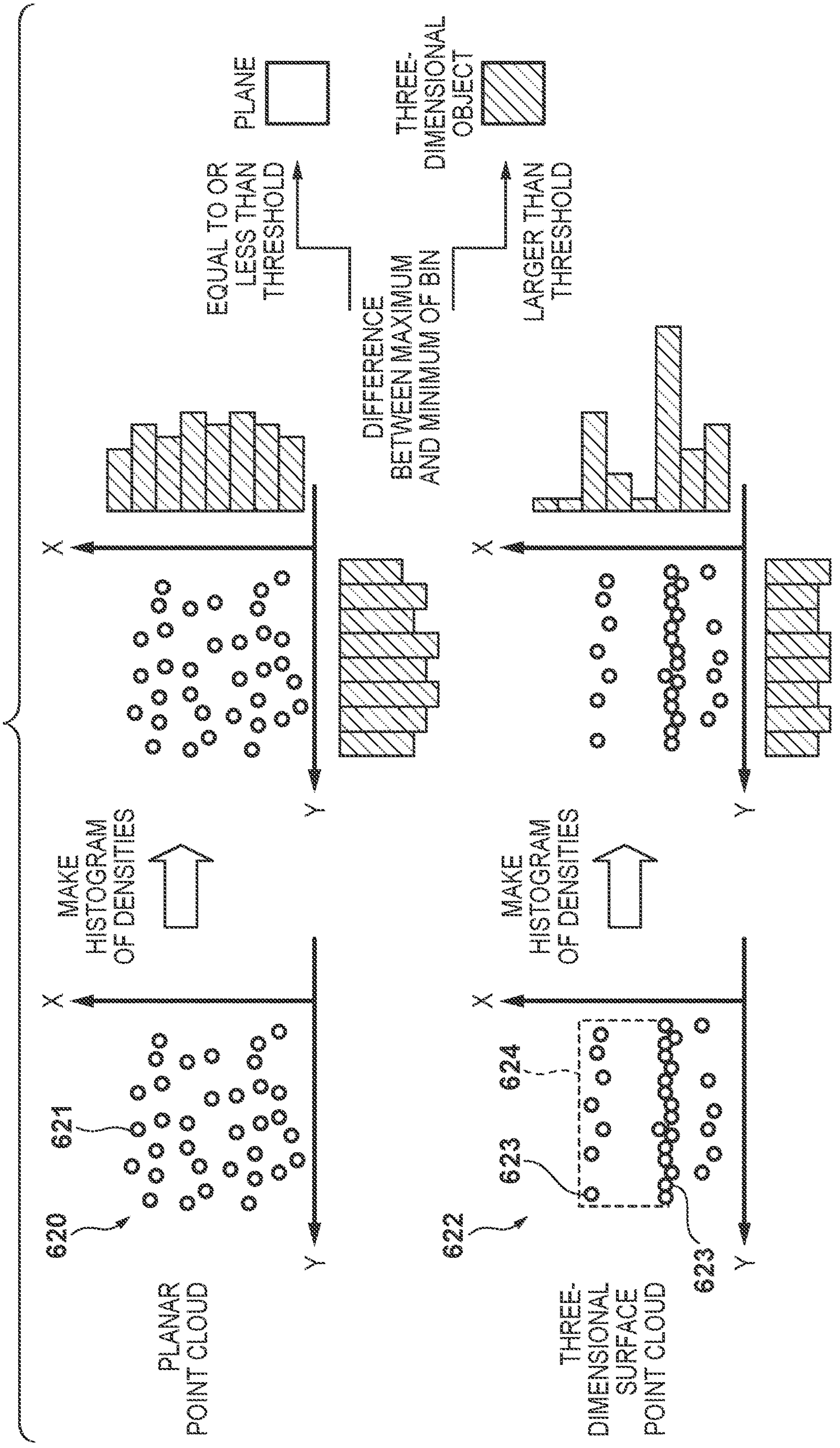
FIG. 6B is a diagram for explaining a first specific example of noise removal processing according to an embodiment.

FIG. 6B illustrates a first example of the noise removal processing according to the present embodiment. A distribution 620 of three-dimensional point cloud data schematically shows a distribution of a point cloud 621 when a point cloud corresponding to one grid of the three-dimensional point cloud data corresponding to a plane is projected on a horizontal plane (XY plane). On the other hand, a distribution 622 of three-dimensional point cloud data schematically shows a distribution of a point cloud 623 when a point cloud corresponding to one grid of the three-dimensional point cloud data corresponding to a three-dimensional object 624 is projected on a horizontal plane.

The grid map generation unit 303 counts the presence or absence of point clouds having a point density exceeding a predetermined threshold in the X direction and the Y direction to generate a histogram. In the distribution 620 of the point cloud when the point cloud corresponding to a plane is projected on the horizontal plane, since the point density of the point cloud is similar, the count value of the point cloud exceeding the point density threshold is a similar value. That is, the difference between the maximum value and the minimum value of the bins of the histogram over the X axis or the Y axis is small. Therefore, when the difference between the maximum value and the minimum value of the bins of the histogram is equal to or less than the threshold, the grid map generation unit 303 can determine that the grid to be processed is not a three-dimensional object (that is, a plane).

On the other hand, in the distribution 622 of the point clouds when the point cloud corresponding to the three-dimensional object is projected on the horizontal plane, since the point clouds are biased, the count value of the point cloud exceeding the point density threshold greatly varies depending on the position. Therefore, when the difference between the maximum value and the minimum value of the bins of the histogram is greater than a threshold, the grid map generation unit 303 can determine that the grid to be processed is the three-dimensional object.

In the example illustrated in FIG. 6B, the histogram is generated by counting in the X direction or the Y direction. However, the histogram may be generated by counting in another angular direction in the XY plane. In this case, the present embodiment can also be applied to a case where the surface of the three-dimensional object is configured at another angle different from the X direction and the Y direction.

In other words, the grid map generation unit 303 determines whether the three-dimensional object exists on the grid according to a result of counting the presence or absence of point clouds having a point density exceeding a predetermined threshold in a first direction in the horizontal plane when the point cloud corresponding to each grid is projected on the horizontal plane. More specifically, the grid map generation unit 303 specifies the maximum value obtained by counting the presence or absence of point clouds having a point density exceeding the predetermined threshold in the first direction and the minimum value obtained by counting the presence or absence of point clouds having a point density exceeding the predetermined threshold in the first direction at other positions in a second direction orthogonal to the first direction. Then, when the difference between the specified maximum value and minimum value is greater than a certain threshold, it is determined that the three-dimensional object exists on the grid.

In this manner, by using the point densities of point clouds when the point clouds are projected on the horizontal plane, it is possible to more appropriately perform the three-dimensional object determination of point clouds to be affected by noise such as white noise as well as spike noise. Note that, in the above determination method, the processing for comparing the maximum value with the minimum value of the bins in the histogram has been described as an example, but other methods may be used. For example, when the difference between the total of the count values of the bins having higher histogram count values and the sum of the count values of the bins having lower histogram count values is greater than a threshold, it may be determined that the three-dimensional object exists on the grid.

Figure 6C:
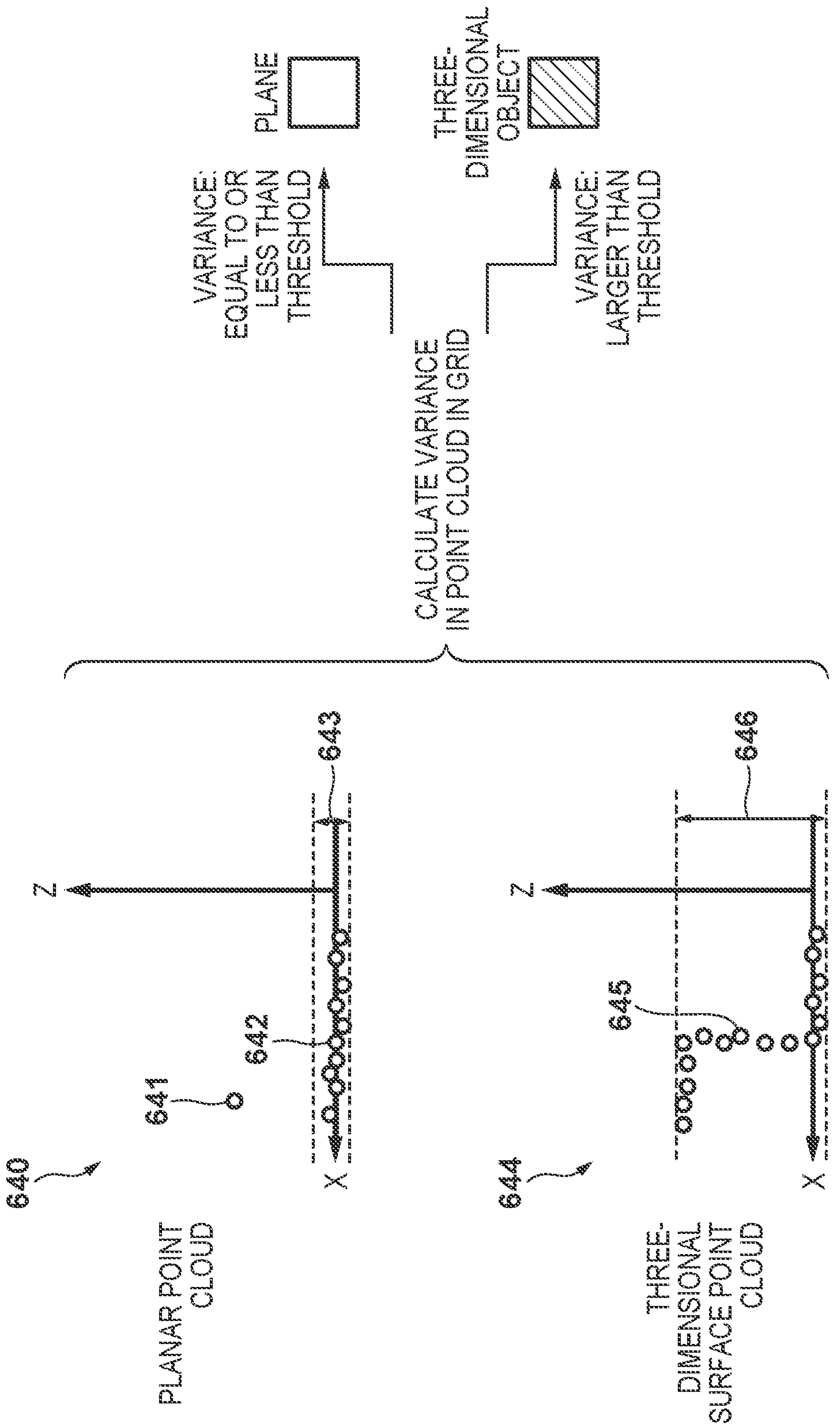
FIG. 6C is a diagram for explaining a second specific example of noise removal processing according to an embodiment.

Next, a second example of the noise removal processing will be described with reference to FIG. 6C. A distribution 640 of three-dimensional point cloud data schematically shows a distribution of point clouds 641 and 642 when a point cloud corresponding to one grid of the three-dimensional point cloud data corresponding to a plane is viewed in the Y-axis direction. On the other hand, a distribution 644 of three-dimensional point cloud data schematically shows a distribution of a point cloud 645 when a point cloud corresponding to one grid of the three-dimensional point cloud data corresponding to a three-dimensional object is viewed in the Y-axis direction.

The grid map generation unit 303 calculates the variance in the height direction (Z direction) orthogonal to the horizontal plane, and determines whether the grid to be processed is a three-dimensional object based on the calculated variance. In the distribution 640 of the point cloud corresponding to the plane, a variance 643 of the point cloud in the Z direction is small. On the other hand, in the distribution 644 of the point cloud corresponding to the three-dimensional object, a variance 646 of the point cloud in the Z direction is large. Therefore, when the variance in the Z direction is equal to or less than a predetermined variance threshold, the grid map generation unit 303 determines that the grid to be processed is not a three-dimensional object (that is, a plane). On the other hand, when the variance in the Z direction is greater than the predetermined variance threshold, it can be determined that the grid to be processed is a three-dimensional object.

Figure 6D:
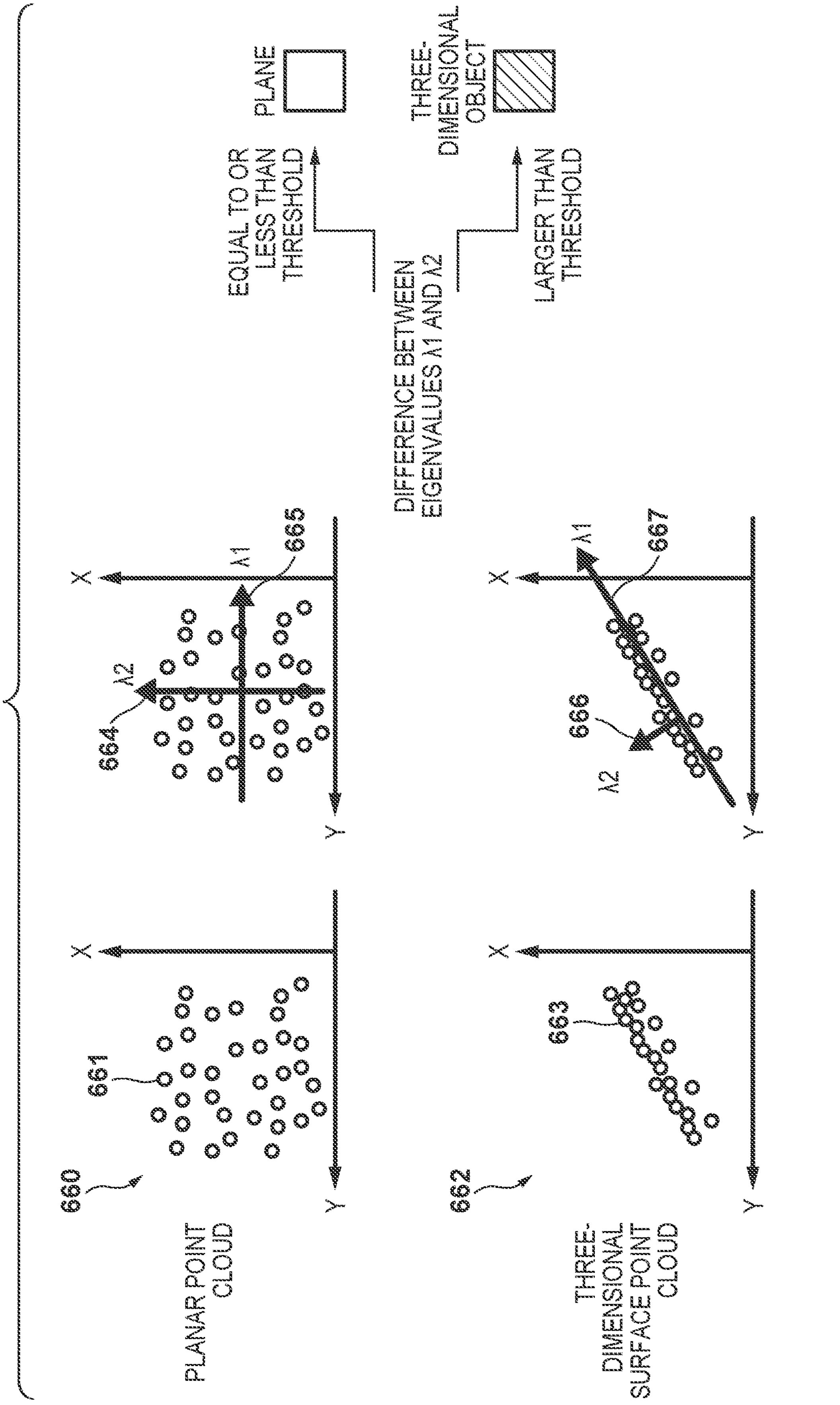
FIG. 6D is a diagram for explaining another specific example of noise removal processing according to an embodiment.

Furthermore, instead of or in addition to the three-dimensional object determination using the point densities illustrated in FIG. 6B, three-dimensional object determination illustrated in FIG. 6D may be used. In FIG. 6D, a distribution 660 of three-dimensional point cloud data schematically shows a distribution of a point cloud 661 when a point cloud corresponding to one grid of the three-dimensional point cloud data corresponding to a plane is projected on a horizontal plane (XY plane). On the other hand, a distribution 662 of three-dimensional point cloud data schematically shows a distribution of a point cloud 663 when a point cloud corresponding to one grid of the three-dimensional point cloud data corresponding to a three-dimensional object is projected on a horizontal plane.

The grid map generation unit 303 generates a covariance matrix expressed by the following Expression 1, and performs principal component analysis with respect to a point cloud when the point cloud corresponding to a plane is projected on the horizontal plane. For example, the grid map generation unit 303 calculates an eigenvalue by solving Expression 2, and determines whether a three-dimensional object exists on the grid based on the magnitude relationship between the calculated eigenvalues λ1 and λ2. The eigenvector is obtained by solving Expression 3 with the calculated eigenvalue

[Expression 1]

$$\Sigma = \begin{pmatrix} \sigma_{xx} & \sigma_{xy} \\ \sigma_{yx} & \sigma_{yy} \end{pmatrix} \tag{1}$$

-continued

[Expression 2]

$$\det\begin{pmatrix} \sigma_{xx} - \lambda & \sigma_{xy} \\ \sigma_{yx} & \sigma_{yy} - \lambda \end{pmatrix} \tag{2}$$

[Expression 3]

$$(A - \lambda E)\ \vec{x} = \vec{0} \tag{3}$$

In the distribution 660, the difference between an eigenvalue 664 and an eigenvalue 665 (i.e., the eigenvalues λ1 and λ2) is not large. Therefore, when the difference between the two eigenvalues is equal to or less than a threshold, the grid map generation unit 303 determines that the grid to be processed is not a three-dimensional object (that is, a plane). On the other hand, when the difference between the two eigenvalues is greater than the threshold, the grid map generation unit 303 determines that the grid to be processed is a three-dimensional object.

Alternatively, instead of or in addition to the three-dimensional object determination using the point densities illustrated in FIG. 6B, it may be determined that the three-dimensional object exists on the grid if the difference between the variance value of the position of a point cloud in a specific direction in which the variance of the position of the point cloud is greatest and the variance value of the position of the point cloud in the direction orthogonal to the specific direction is greater than a threshold when the point cloud corresponding to the grid is projected on the horizontal plane. In this manner, in addition to the three-dimensional surface extending in the X direction or the Y direction shown in FIG. 6B, the three-dimensional surface extending in a direction different from these directions can also be determined.

<Series of Operations of Travel Control Processing in Moving Object 100>

Figure 7A:
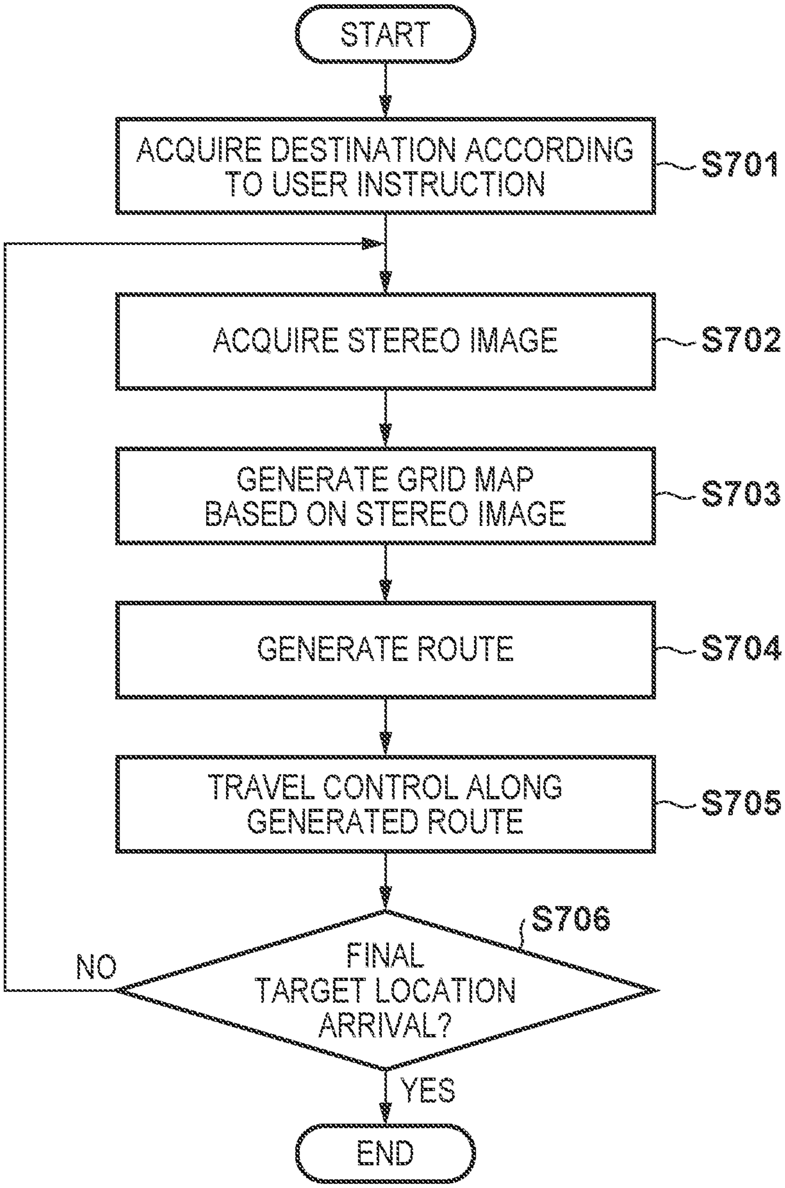
FIG. 7A is a flowchart illustrating a series of operations of travel control processing in a moving object according to an embodiment.

Next, a series of operations of travel control processing in the moving object 100 will be described with reference to FIG. 7A. Note that this processing is achieved as the control unit 130 develops a program stored in the storage device 135 in the memory device of the control unit 130 and executes the program.

In S701, the user instruction acquisition unit 301 of the control unit 130 acquires a destination according to a user instruction based on, for example, voice information. The user instruction includes, for example, designation of a final target location at which the moving object 100 should arrive. For example, the final target location is assumed to be a position of a target object designated by an utterance voice among target objects recognized in the image output by the detection units 114 to 116.

In S702, the image information processing unit 302 acquires a stereo image from the detection units 114. In S703, the image information processing unit 302 and the grid map generation unit 303 perform the grid-map generation processing. For example, the image information processing unit 302 acquires three-dimensional point cloud data using the acquired stereo image. Then, based on the three-dimensional point cloud data generated by the image information processing unit 302, the grid map generation unit 303 performs predetermined processing by mapping the point clouds of the three-dimensional point cloud data to a grid, and then performs the noise removal processing to generate a grid map.

In S704, the route generation unit 304 determines a combination of speed and angular velocity that satisfies predetermined constraint conditions such as a driven wheel and an obstacle, and generates a trajectory of each combination of speed and angular velocity. The route generation unit 304 substitutes the generated trajectory into the cost function. Then, a trajectory with the lowest cost of the cost function is selected. As one of cost functions, the route generation unit 304 can use, for example, a cost function in which the cost decreases as the distance between the grid indicating a three-dimensional object and the trajectory increases on the grid map.

In S705, the traveling control unit 305 controls traveling of the moving object 100 according to the selected trajectory. In S706, the control unit 130 determines whether the moving object 100 has arrived at the final target location. In a case where the control unit 130 determines that the moving object 100 has arrived at the final target location, this series of processing is ended, and otherwise, the processing returns to S702.

<Series of Operations of Grid-Map Generation Processing>

Figure 7B:
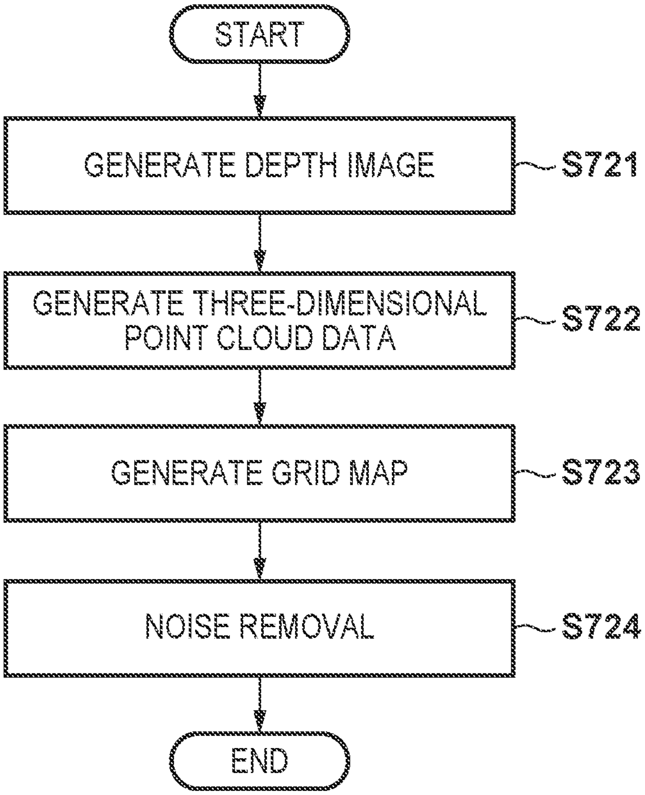
FIG. 7B is a flowchart illustrating a series of operations of grid-map generation processing in a moving object according to an embodiment.

Next, a series of operations of grid-map generation processing will be described with reference to FIG. 7B. Note that this processing is achieved as the control unit 130 develops a program stored in the storage device 135 in the memory device of the control unit 130 and executes the program. Note that this processing is performed when the processing in S703 is started in the operations illustrated in FIG. 7A.

In S721, the image information processing unit 302 generates a depth image including depth information from the moving object 100 using the acquired stereo image. The image information processing unit 302 may use a learned machine learning model (for example, a deep neural network) to generate the depth image. In S722, three-dimensional point cloud data is generated based on the input image and the depth image. The image information processing unit 302 may generate the three-dimensional point cloud data using a known method. A learned machine learning model may also be used to generate the three-dimensional point cloud data.

In S723, the grid map generation unit 303 generates a grid map. As described above, the grid map generation unit 303 can use any known technique, for example, when mapping the point clouds of the three-dimensional point cloud data to the two-dimensional grid. For example, as disclosed in Japanese Patent Laid-Open No. 2018-31753, in a three-dimensional coordinate system, points of a three-dimensional point cloud satisfying a certain condition may be voted on a two-dimensional grid map parallel to a road surface with a predetermined weight, a grid with a voting value greater than or equal to a predetermined threshold may be determined to be a grid on which a three-dimensional object exists, and other grids may be determined to be planes.

In S724, the grid map generation unit 303 performs the above noise removal processing on the grid map generated in S723. In particular, the grid map generation unit 303 performs the noise removal processing on a grid on which a three-dimensional object exists in the grid map. As described with reference to, for example, FIG. 6B, the grid map generation unit 303 counts the presence or absence of point clouds having a point density exceeding a predetermined threshold in the X direction and the Y direction to generate a histogram. Then, the grid map generation unit 303 determines whether a three-dimensional object exists on the grid according to the magnitude of the difference between the maximum value and the minimum value of the bins of the histogram. The grid map generation unit 303 updates the grid map according to the determination result, and then returns to a caller.

As described above, in the above embodiment, three-dimensional point cloud data obtained using an image captured by an imaging device of a moving object is acquired, and a grid map is generated by mapping the point clouds of the three-dimensional point cloud data to a grid on a horizontal plane parallel to the road surface on which the moving object travels. At this time, it is determined, for each grid of the grid map, whether a three-dimensional object exists based on the point density when the point cloud corresponding to each grid of the three-dimensional point cloud data is projected on the horizontal plane. In this manner, it is possible to more suitably reduce the influence of noise when generating a grid-like map indicating the position of an object based on three-dimensional point cloud data.

Note that the configuration of the above control unit 130 may function in various forms as a moving object control system. For example, the moving object control system may be configured in a form in which at least a part of the above control unit 130 is configured on a device outside the moving object 100, for example, an external server. Alternatively, the moving object control system may be the moving object 100. Furthermore, a computer program for operating the above moving object 100 may be a computer program for causing one or more computers to function as each unit of the moving object control system. Furthermore, the moving object control system may be the control unit 130 itself <Summary of Embodiments>

1. A moving object (for example, 100) in the above embodiment comprises:

an acquisition unit (for example, 302) configured to acquire three-dimensional point cloud data in surroundings of the moving object; and a generation unit (for example, 303) configured to generate a grid map based on the three-dimensional point cloud data, the generation unit (for example, 303) being configured to map point clouds of the three-dimensional point cloud data to a grid on a horizontal plane parallel to a road surface on which the moving object travels and generate the grid map in which each grid indicates whether a three-dimensional object having a predetermined height or a step exists, wherein the generation unit determines, for each grid of the grid map, whether the three-dimensional object exists based on a point density when a point cloud corresponding to each grid of the three-dimensional point cloud data is projected on the horizontal plane.

According to this embodiment, it is possible to more suitably reduce the influence of noise when generating a grid-like map indicating the position of an object based on the three-dimensional point cloud data.

2. In the moving object in the above embodiment, wherein the generation unit determines whether the three-dimensional object exists on the grid according to a result of counting presence or absence of point clouds having a point density exceeding a predetermined threshold in a first direction in the horizontal plane when the point cloud corresponding to each grid is projected on the horizontal plane.

According to this embodiment, it is possible to reduce the influence of white noise in addition to spike noise in the three-dimensional point cloud data when the grid map is generated.

3. In the moving object in the above embodiment, wherein the generation unit determines that the three-dimensional object exists on the grid if a difference between a maximum value obtained by counting presence or absence of point clouds having a point density exceeding the predetermined threshold in the first direction and a minimum value obtained by counting presence or absence of point clouds having a point density exceeding the predetermined threshold in the first direction at other positions in a second direction orthogonal to the first direction is greater than a threshold when the point cloud corresponding to each grid is projected on the horizontal plane.

According to this embodiment, it is possible to appropriately determine the bias of a point cloud formed by a three-dimensional surface.

4. In the moving object in the above embodiment, wherein the generation unit determines that the three-dimensional object exists on the grid if a difference between a total of a predetermined number of higher counts obtained by counting presence or absence of point clouds having a point density exceeding the predetermined threshold in the first direction at different positions in a second direction orthogonal to the first direction and a total of a predetermined number of lower counts obtained by counting presence or absence of point clouds having a point density exceeding the predetermined threshold in the first direction at different positions in the second direction is greater than a threshold when the point cloud corresponding to each grid is projected on the horizontal plane.

According to this embodiment, it is possible to determine a three-dimensional object even when the bias of a point cloud formed by a three-dimensional surface has a wide range.

5. In the moving object in the above embodiment, wherein the generation unit determines that the three-dimensional object exists on the grid if the difference between a variance value of a position of a point cloud in a specific direction in which a variance of the position of the point cloud is greatest and a variance value of a position of the point cloud in a direction orthogonal to the specific direction is greater than a threshold when the point cloud corresponding to the grid is projected on the horizontal plane.

According to this embodiment, it is also possible to determine a three-dimensional surface extending in an oblique direction with respect to the XY plane.

6. In the moving object in the above embodiment, wherein the generation unit calculates a plurality of eigenvalues by a principal component analysis with respect to a position of a point cloud when the point cloud corresponding to each grid is projected on the horizontal plane, and determines whether the three-dimensional object exists on the grid based on a magnitude relationship between the calculated eigenvalues.

According to this embodiment, it is also possible to determine a three-dimensional surface extending in an oblique direction with respect to the XY plane.

7. In the moving object in the above embodiment, wherein the generation unit determines that the three-dimensional object exists on the grid when at least one or more of the calculated eigenvalues are equal to or less than a predetermined threshold.

According to this embodiment, it is possible to appropriately determine that a three-dimensional object exists in the determination using the eigenvalues.

8. In the moving object in the above embodiment, wherein the generation unit calculates a variance of the point cloud corresponding to each grid in a height direction orthogonal to the horizontal plane, and further determines whether the three-dimensional object exists based on whether the calculated variance is greater than a predetermined variance threshold.

According to this embodiment, it is possible to further reduce the influence of spike noise in the height direction.

9. In the moving object in the above embodiment, wherein the generation unit sets a height of the moving object as a reference height and removes in advance a point cloud at a predetermined height from the reference height from the point clouds of the three-dimensional point cloud data.

According to this embodiment, it is possible to reduce the influence of an object at a high position that does not affect the traveling of the moving object.

10. In the moving object in the above embodiment, wherein the generation unit adds, to the reference height, a height according to a predetermined gradient at which the moving object is travelable and a distance between each grid and the moving object and removes in advance a point cloud at or above the reference height after the addition.

According to this embodiment, it is possible to consider the reference height of the moving object that can vary according to traveling and to more accurately reduce the influence of an object at a high position that does not affect the traveling of the moving object.

11. In the moving object in the above embodiment, wherein the acquisition unit acquires the three-dimensional point cloud data using an image captured by an imaging device of the moving object.

According to this embodiment, it is possible to acquire three-dimensional point cloud data with a simpler configuration than a case of using a light detection and ranging (LIDAR).

12. In the moving object in the above embodiment, wherein the generation unit further determines, for the grid on which the three-dimensional object is determined to exist by mapping the point clouds of the three-dimensional point cloud data to the grid on the horizontal plane and performing predetermined processing, whether the three-dimensional object exists based on a point density when the point cloud corresponding to each grid of the three-dimensional point cloud data is projected on the horizontal plane.

According to this embodiment, it is possible to limit the number of grids to which the noise removal processing is applied and to improve the processing speed.

13. The moving object in the above embodiment, further comprises a route generation unit configured to generate a route being a traveling trajectory to avoid an obstacle, using the grid map.

According to this embodiment, it is possible to improve the stability of route generation by using the grid map in which the influence of noise is reduced.

14. In the moving object in the above embodiment, wherein the moving object is a micro mobility vehicle that allows a person to get on.

According to this embodiment, in a micro mobility vehicle, it is possible to more suitably reduce the influence of noise when generating a grid-like map indicating the position of an object based on the three-dimensional point cloud data and to stabilize traveling of the micro mobility vehicle using the grid map.

The invention is not limited to the foregoing embodiments, and various variations/changes are possible within the spirit of the invention.

What is claimed is:

1. A moving object comprising:

one or more processors; and a memory storing instructions which, when the instructions are executed by the one or more processors, cause the moving object to:

acquire three-dimensional point cloud data in surroundings of the moving object;

generate a grid map based on the three-dimensional point cloud data, wherein causing the moving object to generate the grid map includes mapping point clouds of the three-dimensional point cloud data to a grid on a horizontal plane parallel to a road surface on which the moving object travels and generating the grid map in which each grid indicates whether a three-dimensional object having a predetermined height or a step exists; and control traveling of the moving object based on the generated grid map, wherein the instructions cause the moving object to determine, for each grid of the grid map, whether the three-dimensional object exists based on a point density when a point cloud corresponding to each grid of the three-dimensional point cloud data is projected on the horizontal plane, wherein the instructions cause the moving object to determine whether the three-dimensional object exists on the grid according to a result of counting presence or absence of point clouds having a point density exceeding a predetermined threshold in a first direction in the horizontal plane when the point cloud corresponding to each grid is projected on the horizontal plane, and wherein the instructions cause the moving object to determine that the three-dimensional object exists on the grid if a difference between a maximum value obtained by counting presence or absence of point clouds having a point density exceeding the predetermined threshold in the first direction and a minimum value obtained by counting presence or absence of point clouds having a point density exceeding the predetermined threshold in the first direction at other positions in a second direction orthogonal to the first direction is greater than a threshold when the point cloud corresponding to each grid is projected on the horizontal plane.

2. The moving object according to claim 1, wherein the instructions cause the moving object to determine that the three-dimensional object exists on the grid if a difference between a total of a predetermined number of higher counts obtained by counting presence or absence of point clouds having a point density exceeding the predetermined threshold in the first direction at different positions in a second direction orthogonal to the first direction and a total of a predetermined number of lower counts obtained by counting presence or absence of point clouds having a point density exceeding the predetermined threshold in the first direction at different positions in the second direction is greater than a threshold when the point cloud corresponding to each grid is projected on the horizontal plane.

3. The moving object according to claim 1, wherein the instructions cause the moving object to determine that the three-dimensional object exists on the grid if the difference between a variance value of a position of a point cloud in a specific direction in which a variance of the position of the point cloud is greatest and a variance value of a position of the point cloud in a direction orthogonal to the specific direction is greater than a threshold when the point cloud corresponding to the grid is projected on the horizontal plane.

4. The moving object according to claim 1, wherein the instructions cause the moving object to calculate a plurality of eigenvalues by a principal component analysis with respect to a position of a point cloud when the point cloud corresponding to each grid is projected on the horizontal plane, and determine whether the three-dimensional object exists on the grid based on a magnitude relationship between the calculated eigenvalues.

5. The moving object according to claim 4, wherein the instructions cause the moving object to determine that the three-dimensional object exists on the grid when at least one or more of the calculated eigenvalues are equal to or less than a predetermined threshold.

6. The moving object according to claim 1, wherein the instructions cause the moving object to calculate a variance of the point cloud corresponding to each grid in a height direction orthogonal to the horizontal plane, and further determine whether the three-dimensional object exists based on whether the calculated variance is greater than a predetermined variance threshold.

7. The moving object according to claim 1, wherein the instructions cause the moving object to set a height of the moving object as a reference height and removes in advance a point cloud at a predetermined height from the reference height from the point clouds of the three-dimensional point cloud data.

8. The moving object according to claim 7, wherein the instructions cause the moving object to add, to the reference height, a height according to a predetermined gradient at which the moving object is travelable and a distance between each grid and the moving object and remove in advance a point cloud at or above the reference height after the addition.

9. The moving object according to claim 1, wherein the instructions cause the moving object to acquire the three-dimensional point cloud data using an image captured by an imaging device of the moving object.

10. The moving object according to claim 1, wherein the instructions further cause the moving object to determine, for the grid on which the three-dimensional object is determined to exist by mapping the point clouds of the three-dimensional point cloud data to the grid on the horizontal plane and performing predetermined processing, whether the three-dimensional object exists based on a point density when the point cloud corresponding to each grid of the three-dimensional point cloud data is projected on the horizontal plane.

11. The moving object according to claim 1, wherein the instructions further cause the moving object to generate a route being a traveling trajectory to avoid an obstacle, using the grid map.

12. The moving object according to claim 1, wherein the moving object is a micro mobility vehicle that allows a person to get on.

13. A control method of a moving object, the control method comprising:

an acquisition step of acquiring three-dimensional point cloud data in surroundings of the moving object; and a generation step of generating a grid map based on the three-dimensional point cloud data, the generation step including mapping point clouds of the three-dimensional point cloud data to a grid on a horizontal plane parallel to a road surface on which the moving object travels and generating the grid map in which each grid indicates whether a three-dimensional object having a predetermined height or a step exists; and a controlling step of controlling traveling of the moving object based on the generated grid map, wherein the generation step includes determining, for each grid of the grid map, whether the three-dimensional object exists based on a point density when a point cloud corresponding to each grid of the three-dimensional point cloud data is projected on the horizontal plane, wherein the generation step includes determining whether the three-dimensional object exists on the grid according to a result of counting presence or absence of point clouds having a point density exceeding a predetermined threshold in a first direction in the horizontal plane when the point cloud corresponding to each grid is projected on the horizontal plane, and wherein the generation step includes to determining that the three-dimensional object exists on the grid if a difference between a maximum value obtained by counting presence or absence of point clouds having a point density exceeding the predetermined threshold in the first direction and a minimum value obtained by counting presence or absence of point clouds having a point density exceeding the predetermined threshold in the first direction at other positions in a second direction orthogonal to the first direction is greater than a threshold when the point cloud corresponding to each grid is projected on the horizontal plane.

14. A non-transitory computer-readable storage medium storing instructions causing the moving object to:

acquire three-dimensional point cloud data in surroundings of the moving object;

generate a grid map based on the three-dimensional point cloud data, wherein causing the moving object to generate the grid map includes mapping point clouds of the three-dimensional point cloud data to a grid on a horizontal plane parallel to a road surface on which the moving object travels and generating the grid map in which each grid indicates whether a three-dimensional object having a predetermined height or a step exists; and control traveling of the moving object based on the generated grid map, wherein the instructions cause the moving object to determine, for each grid of the grid map, whether the three-dimensional object exists based on a point density when a point cloud corresponding to each grid of the three-dimensional point cloud data is projected on the horizontal plane, wherein the instructions cause the moving object to determine whether the three-dimensional object exists on the grid according to a result of counting presence or absence of point clouds having a point density exceeding a predetermined threshold in a first direction in the horizontal plane when the point cloud corresponding to each grid is projected on the horizontal plane, and wherein the instructions cause the moving object to determine that the three-dimensional object exists on the grid if a difference between a maximum value obtained by counting presence or absence of point clouds having a point density exceeding the predetermined threshold in the first direction and a minimum value obtained by counting presence or absence of point clouds having a point density exceeding the predetermined threshold in the first direction at other positions in a second direction orthogonal to the first direction is greater than a threshold when the point cloud corresponding to each grid is projected on the horizontal plane.

15. A control system of a moving object, the control system comprising:

one or more processors; and a memory storing instructions which, when the instructions are executed by the one or more processors, cause the control system to:

acquire three-dimensional point cloud data in surroundings of the moving object;

generate a grid map based on the three-dimensional point cloud data, wherein causing the control system to generate the grid map includes mapping point clouds of the three-dimensional point cloud data to a grid on a horizontal plane parallel to a road surface on which the moving object travels and generating the grid map in which each grid indicates whether a three-dimensional object having a predetermined height or a step exists; and control traveling of the moving object based on the generated grid map, wherein the instructions cause the control system to determine, for each grid of the grid map, whether the three-dimensional object exists based on a point density when a point cloud corresponding to each grid of the three-dimensional point cloud data is projected on the horizontal plane, wherein the instructions cause the control system to determine whether the three-dimensional object exists on the grid according to a result of counting presence or absence of point clouds having a point density exceeding a predetermined threshold in a first direction in the horizontal plane when the point cloud corresponding to each grid is projected on the horizontal plane, and wherein the instructions cause the control system to determine that the three-dimensional object exists on the grid if a difference between a maximum value obtained by counting presence or absence of point clouds having a point density exceeding the predetermined threshold in the first direction and a minimum value obtained by counting presence or absence of point clouds having a point density exceeding the predetermined threshold in the first direction at other positions in a second direction orthogonal to the first direction is greater than a threshold when the point cloud corresponding to each grid is projected on the horizontal plane.

* * * * *